May 31, 1960 P. DE GRAAF 2,938,382
FLUID METER

Filed July 18, 1955 6 Sheets-Sheet 1

INVENTOR.
PIETER DE GRAAF
BY
Wenderoth, Lind + Ponack
Attys.

May 31, 1960  P. DE GRAAF  2,938,382
FLUID METER
Filed July 18, 1955  6 Sheets-Sheet 2

INVENTOR
PIETER DE GRAAF
BY
Wenderoth, Lind & Ponack
Attys

May 31, 1960 P. DE GRAAF 2,938,382
FLUID METER

Filed July 18, 1955 6 Sheets-Sheet 3

INVENTOR.
PIETER DE GRAAF
BY
Wenderoth, Lind & Ponack
Attys

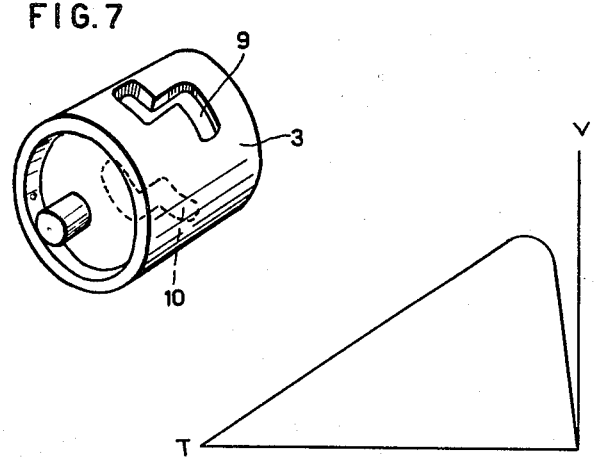
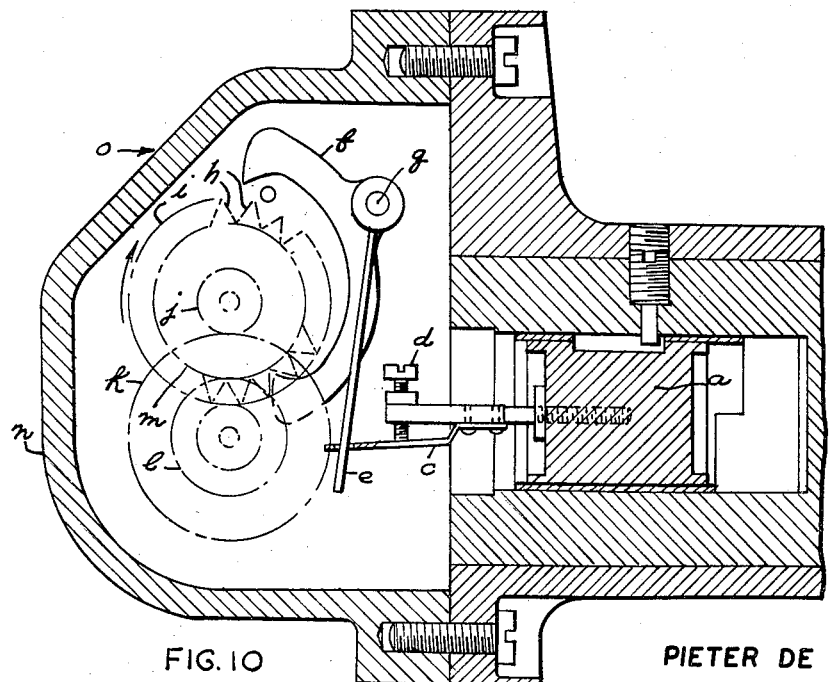

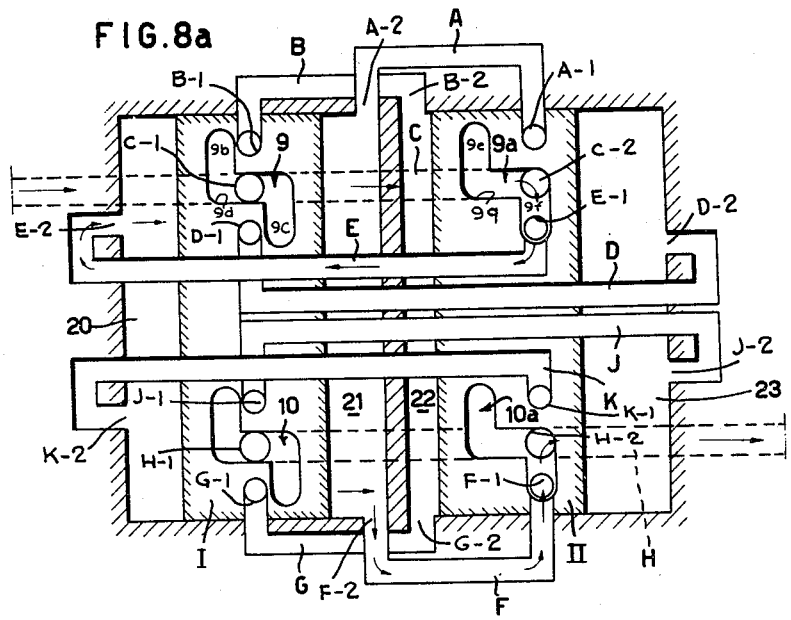
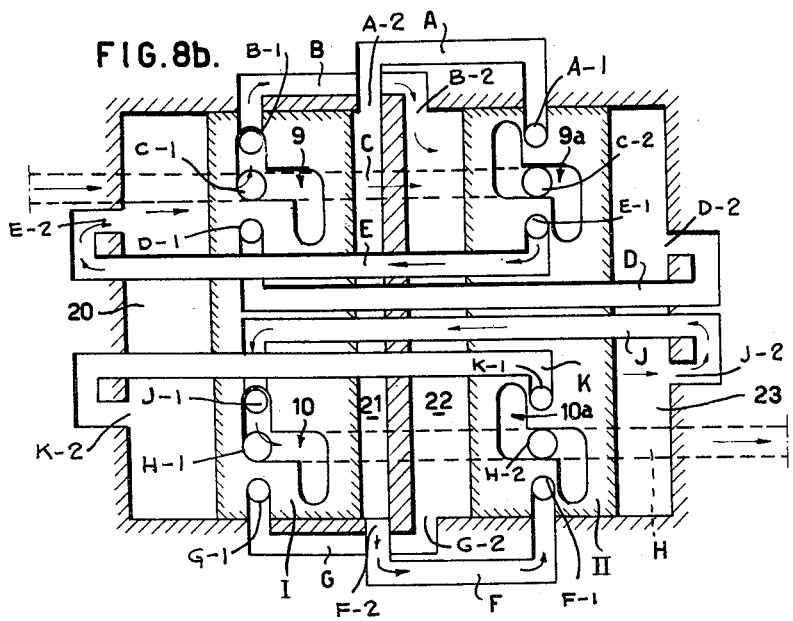

May 31, 1960 P. DE GRAAF 2,938,382
FLUID METER
Filed July 18, 1955 6 Sheets-Sheet 6

INVENTOR.
PIETER DE GRAAF
BY
Wenderoth, Lind & Ponack
Attys.

United States Patent Office 2,938,382
Patented May 31, 1960

2,938,382
FLUID METER

Pieter de Graaf, Dordrecht, Netherlands, assignor to N.V. Vloeistofmeetapparatenfabriek, Dordrecht, Netherlands, a Dutch limited-liability company Filed July 18, 1955, Ser. No. 522,785

Claims priority, application Netherlands Apr. 29, 1955

6 Claims. (Cl. 73—242)

The present invention relates to an apparatus for measuring fluids, such as liquids or gases.

The primary object of the invention is to provide a very reliable meter of simple and compact construction and long life.

The meter according to the invention comprises a housing, pistons adapted to be reciprocated in said housing, measuring chambers at both sides of said pistons, means for preventing rotation of said pistons in said housing, said pistons being mutually free from mechanical interconnection and being movable by fluid periodically supplied to their opposite surfaces, six fluid carrying conduits in the housing, the fluid through said conduits being controlled by control slots provided in the piston bodies in the circumference thereof and being so arranged that the measuring chambers at both sides of each piston are alternately in connection either with the inlet for the supply of fluid or with the outlet for the discharge of fluid.

Such a meter has no diaphragms, springs, or similar delicate and vulnerable parts.

There is no mechanical coupling means between the pistons. This promotes simplicity.

There is no dead point in the movement of the pistons, so that no positions occur in which there would be no positive action of the fluid on a piston.

The pistons may be of very simple construction. They may be formed of a single part or several parts which however need not at all be mutually movable.

For a satisfactory operation it is useful that the specific weight of the piston be greater than that of the fluid for which the meter has been designed. Then the pistons have sufficient mass, so that the first half of the piston stroke may take more time than the second half and the pistons will always move along their full stroke. The time-speed diagram of these pistons will have more the character of a saw tooth than of half a sine line.

However then it is to be recommended that the piston is braked at the end of its stroke to prevent knocking.

This may be simply achieved by providing outlet ports in the meter house such that same will be throttled during the braking path of the pistons.

In the drawing:

Fig. 7 shows a perspective view of a piston;

Figures 8a, 8b, 8c and 8d show schematically the fluid flow for different positions of the pistons;

Fig. 9 is a graph showing the speed of a piston in relation to time;

Fig. 10 is a cross-sectional view with parts in elevation illustrating a control and drive mechanism which may be used with the meter of this invention.

Fig. 1 shows the complete meter. From this figure it will be clear how very simple and compact such a meter can be built.

This meter is furthermore such that the flow direction of the fluid is never reversed in the various fluid carrying passages. The advantage thereof is that no substantial impulses or knocks can occur in the conduits.

Figure 1:
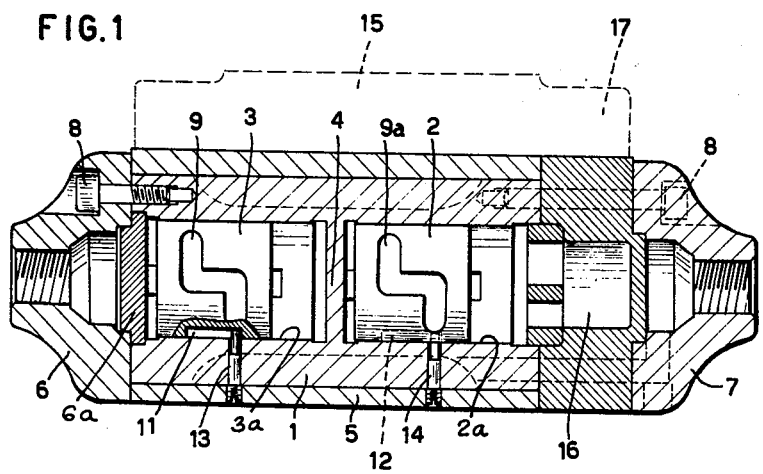
Fig. 1 is a longitudinal section of the meter.
Figure 2:
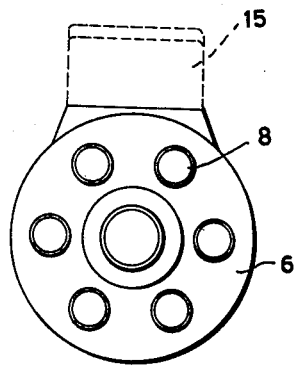
Fig. 2 is an end view.

In Fig. 1 a cylindrical meter house 1 is provided with fluid carrying conduits to be described more in detail.

Two pistons 2 and 3, which are not mechanically interconnected, can reciprocate in the cylinders 2a and 3a at both sides of a partition wall 4.

The house 1 is surrounded by a cylinder 5, which delimits fluid carrying conduits or passages in the house 1.

The ends of the house 1 are closed by end covers 6 and 7, secured by screws 8.

Fluid enters through cover 6 and is delivered through cover 7. The disk-like piece 6a delimits the cylinder 2a.

The pistons 2 and 3 are of very simple shape as appears from Fig. 7. In their outer surface they are provided with S-shaped control slots 9 and 10, and 9a and 10a respectively which constitute fluid carrying passages and straight axial grooves 11 and 12, in which pointed screws 13 and 14 screwed in the house extend. Each control slot has the same construction, for example (Figure 8a), slot 9 has two axially spaced control slots 9b and 9c connected for fluid communication by a transverse channel 9d.

These grooves and screws serve to rectilinearly guide the pistons. This is necessary for a correct cooperation of the chambers 9 and 10 with ports and channels in the house.

At 15 the place for mounting a computer (counting device) is indicated.

This computer can be driven by a ratchet device or the like, which gets periodical impulses by means of a gearing when a piston moves from an end position near a cover 6 or 7 in the direction of the wall 4.

Some part extending from the piston can then exert a force on the gearing and the ratchet device.

The gearing is mounted in the rooms 16 and 17 shown in Fig. 1, which rooms are in communication.

Figure 3:
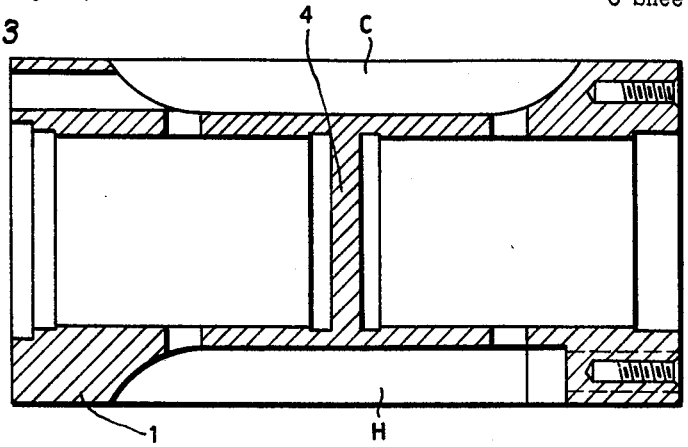
Fig. 3 illustrates the location of some conduits in a longitudinal section of the meter house.
Figure 4:
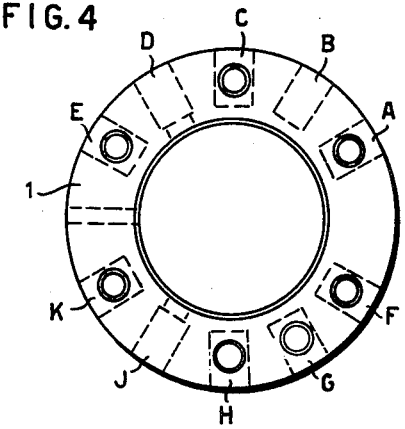
Fig. 4 is an end view of Fig. 3 seen from the right of that figure.
Figure 5:
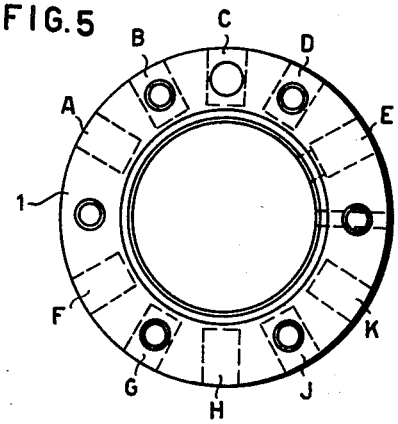
Fig. 5 is an end view of Fig. 3 seen from the left in said figure.
Figure 6:
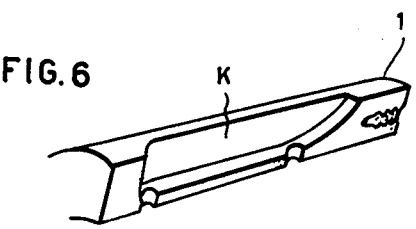
Fig. 6 illustrates the shape of one of the passages in the house.

According to Figures 3, 4 and 5 the house 1 is provided with fluid carrying conduits A, B, C, D, E, F, G, H, J and K.

The conduits have different dimensions and shapes as is well shown in the drawings and they occupy different places in longitudinal direction of the house.

In Figure 3 the conduits C and H are shown. The conduit C is connected to the inlet of cover 6 and in effect forms part of the fluid inlet for the meter. The conduit H is connected to the outlet of the cover 7 and in effect forms a part of the fluid outlet for the meter.

Figure 3A:
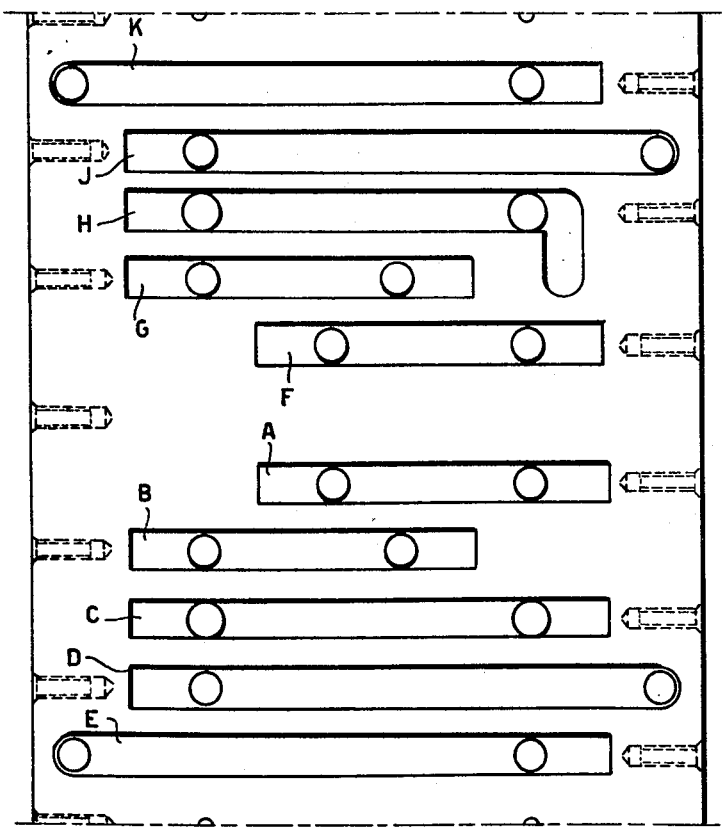
Fig. 3a is a development of the circumference of the house according to Fig. 3.

Figure 3a represents how the conduits are situated in the house and Figures 4 and 5 illustrate how the conduits are formed in radial direction of the house. Each of the conduits is formed in the housing in a manner to have ports open to the cylinders as shown. The ports are labeled A–1, A–2, B–1, B–2, etc.

Figure 8C:
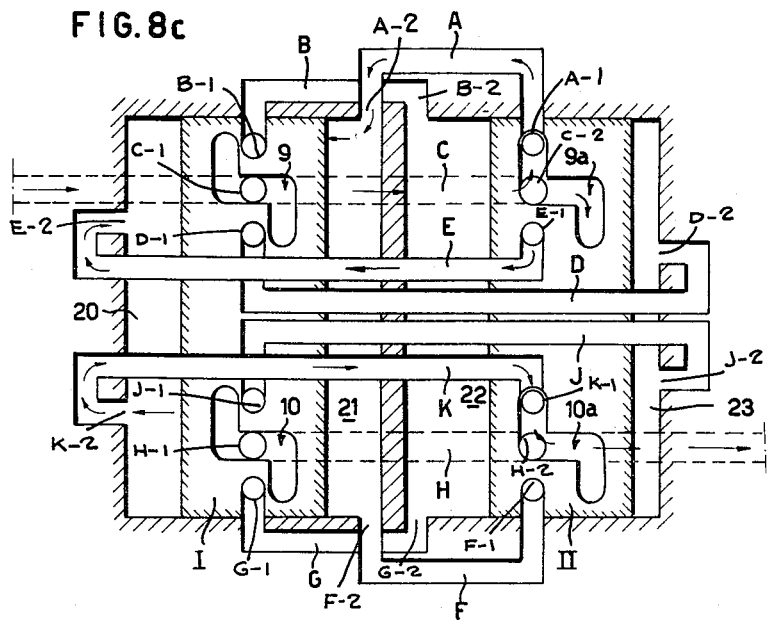
Figure 8D:
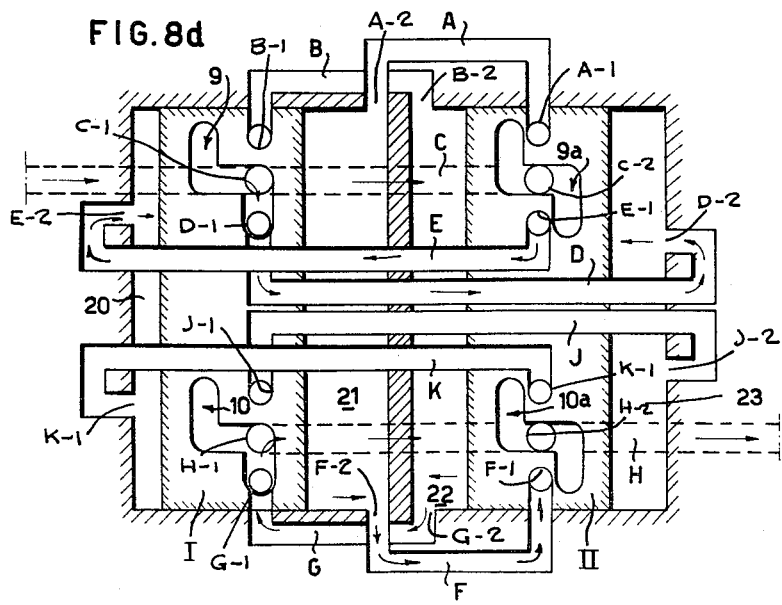

In the Figures 8a, b, c, d all the conduits A to K inclusive are found again and clearly shown in diagrammatical manner such that the fluid flow may be well followed in four positions of the pistons. In each conduit the fluid always flows in the same direction.

In Figure 8a the piston I is moving to the right. The flow from the inlet is clear, namely through conduit C, port C-2, slot 9f in piston II, port E-1, E port E-2 to measuring chamber 20.

From measuring chamber 21 fluid is discharged thru port F-2, conduit F, port F-1, slot 10f in piston II, port H-2 and channel H.

Piston II is at the end of its inward stroke, but immediately gets an impulse from the left, when slot 9 comes in communication with port B-1 of conduit B, which leads fluid from inlet C, port 9d, slot 9b, port B-1, conduit B, port B-2 and thence to the measuring chamber 22 (see Figure 8b).

By 23a further measuring chamber is indicated.

The further operation is evident when Figures 8b, c and d are considered in succession.

The result is that the meter will always start to work in whatever position of the pistons.

At the end of their stroke the pistons throttle the discharge ports in the house, such that the pistons will be braked and prevented from knocking.

Referring to Fig. 10 there is shown a control and drive mechanism which may be used with the meter above described. The drive mechanism is provided with an escapement. One of the pistons $a$ is provided with an extension $b$ to which is fastened a spring leaf $c$. Through a hole of said spring leaf passes an arm $e$ which is fastened to an escapement lever $f$ pivotable about an axis $g$. The angular movement of lever $e$ and the escapement lever $f$ can be modified with respect to the stroke of piston $a$ by means of a screw $d$.

It is clear that if the screw $d$ is screwed back in the extension $b$ the spring leaf $c$ will move in upward direction so that its distance to the axis $g$ will become smaller which will reduce the angular movement of $e$ and $f$ for a given course of piston $a$. The escapement lever $f$ is provided with two teeth which cooperate with the teeth $h$ of an escapement wheel $i$ forcing said wheel to turn step by step in one direction. The escapement wheel $i$ is provided with a gear wheel $j$ meshing with a gear wheel $k$. This gear wheel in its turn is connected with a gear wheel $l$ meshing with a gear wheel $m$ revolving around the same axis as the escapement wheel $i$ and connected with the first roller of the counter mechanism which carries the numerals. These numerals as well as the numerals of the other rollers of the counter mechanism can be observed through a transparent casing $n$ along the arrow $o$. It would of course be possible to provide a casing of a non-transparent material such as a metal and to arrange therein a window, but this would be more complicated. This casing is fixed to the casing of the metering device and is filled with the liquid. The advantage thereof is that no moving parts have to be brought to the exterior of the casing which would require sealing means. Sealing means are of course undesirable because they would cause friction losses.

What I claim is:

1. In a fluid meter: a housing formed with a fluid inlet and a fluid outlet and with first and second cylinders, the axes of the cylinders being substantially coaxial; two pistons respectively disposed in said cylinders for movement back and forth therein, the pistons and cylinders being constructed and arranged whereby measuring chambers are formed at the opposite ends of each of the cylinders; means for preventing rotation of the pistons; and for each piston, a first and a second pair of axially spaced slots formed on the piston each constituting a fluid passage, the first pair being arranged to receive fluid from said inlet and the second pair being arranged to transfer fluid to said outlet, fluid carrying conduits in said housing respectively interconnecting said first pair of slots with the respective measuring chambers for the other piston in accordance with the position of the said piston to transfer fluid in a direction from a slot to a measuring chamber, and fluid carrying conduits in said housing respectively interconnecting said second pair of slots with the respective measuring chambers for the other piston in accordance with the position of the said piston to transfer fluid in a direction from a measuring chamber to a slot.

2. In a fluid meter: a housing formed with a fluid inlet and a fluid outlet and with first and second cylinders, the axes of the cylinders being substantially coaxial; two pistons respectively disposed in said cylinders for movement back and forth therein, the pistons and cylinders being constructed and arranged whereby measuring chambers are formed at the opposite ends of each of the cylinders; means for preventing rotation of the pistons; and for each piston, a first pair of axially spaced slots formed on the piston each constituting a fluid passage and adapted to move therewith, a pair of fluid carrying conduits, the conduits being respectively connected to the measuring chambers of the other piston, a fluid carrying inlet port connected to said inlet alternatively in communication with one or the other of said fluid carrying conduits by way of one of said slots in accordance with the movement of the piston whereby fluid is transferred in a direction from the inlet channel to a measuring chamber, a second pair of axially spaced slots formed on the piston and each constituting a fluid passage and adapted to move therewith, a second pair of fluid carrying conduits respectively connected to the measuring chambers for the other piston, and a fluid carrying outlet port connected to said outlet alternatively in communication with one or the other of said second fluid carrying conduits by way of one of last said slots in accordance with the movement of the piston whereby fluid is transferred in a direction from a measuring chamber to the outlet channel.

3. In a fluid meter: a housing formed with a fluid inlet and a fluid outlet and with first and second cylinders, the axes of the cylinders being substantially coaxial; two pistons respectively disposed in said cylinders for movement back and forth therein, the pistons and cylinders being constructed and arranged whereby measuring chambers are formed at the opposite ends of the cylinders; means for preventing rotation of the pistons; a fluid inlet in said housing; a fluid outlet in said housing; and for each piston, a first and a second control slot, each slot being formed on the piston by a pair of axially spaced passages connected for fluid communication by a transverse channel, the first control slot connected with said inlet and the second control slot connected with said outlet, fluid carrying conduits in said housing respectively interconnecting said passages of said first slot with the respective measuring chambers for the other piston in accordance with the position of the said piston, and fluid carrying conduits in said housing respectively interconnecting said passages of said second slot with the respective measuring chambers for the other piston in accordance with the position of the said piston.

4. In a fluid meter: a housing formed with a fluid inlet and a fluid outlet and with first and second cylinders, the axes of the cylinders being substantially coaxial; two pistons respectively disposed in said cylinders for movement back and forth therein, the pistons and cylinders being constructed and arranged whereby measuring chambers are formed at the opposite ends of the cylinders; means for preventing rotation of the pistons; and for each piston, a first and a second control slot, each slot being formed in the piston by a pair of axially spaced passages connected for fluid communication by a transverse channel, a pair of fluid carrying conduits in said housing, each having a port opening to the cylinder containing the piston, the ports lying substantially in the same radial plane and being respectively connectable with said first control slot in accordance with the movement of the piston, the conduits being respectively connected to the measuring chambers for the other piston and said fluid inlet being formed with a port opening to said cylinder and lying substantially in said plane and in communication with said first control slot for all operative positions of the piston, a second pair of fluid carrying conduits in said housing each having a port open to said cylinder, the ports lying substantially in said plane and being respectively connectible with one of said second control slot in accordance with the movement of said piston, the conduits being respectively connected to the measuring chambers for the other piston and said fluid outlet being formed with a port open to said cylinder and lying substantially in said plane and in communication with said second control slot for all operative positions of the piston.

5. In a fluid meter: a housing formed with a fluid inlet and a fluid outlet and with first and second cylinders, the axes of the cylinders being substantially co-axial; two pistons respectively disposed in said cylinders for movement back and forth, the pistons and cylinders being constructed and arranged whereby measuring chambers are formed at the opposite ends of each of the cylinders; and for each piston, a first and a second control slot, each slot constituting a fluid passage formed on the piston, the first slot being in communication with said inlet and the second being in communication with said outlet, first fluid carrying conduits in said housing interconnecting said first slot with one or the other of the measuring chambers of the other piston in accordance with the movement of the said piston, and second fluid carrying conduits in said housing interconnecting said second slot with one or the other of the control chambers of the other piston in opposite relation to the connection made by said first fluid carrying conduits and in accordance with the movement of the said piston.

6. In a fluid meter: a housing formed with a fluid inlet and a fluid outlet and with first and second cylinders, the axes of the cylinders being substantially co-axial and both the inlet and outlet being in fluid communication with both of said cylinders; two pistons, the first disposed on the first cylinder and the second disposed in the second cylinder for movement back and forth therein, the pistons and cylinders being constructed and arranged whereby inner and outer measuring chambers are formed at the opposite ends of each of the cylinders; means for preventing rotation of the pistons; a first group of four fluid carrying inlet conduits each respectively extending between a measuring chamber and the opposite cylinder, each conduit acting to transfer fluid to its associated measuring chamber; a second group of four fluid carrying outlet conduits each respectively extending between a measuring chamber and the opposite cylinder, each passage acting to transfer fluid from its associated measuring chamber; a first pair of fluid control slots formed on said first piston, one being adapted to interconnect, in accordance with the position of the first piston, said inlet with the first of said inlet conduits and the other to interconnect said outlet with the first of said outlet conduits whereby fluid is transferred respectively to and from the measuring chambers of the second cylinder to cause the second piston to move; a first pair of fluid control slots formed on said second piston, one being adapted to interconnect, in accordance with the position of the second piston, said inlet with the second of said inlet conduits and the other to interconnect said outlet with the second of said outlet conduits whereby fluid is transferred respectively to and from the measuring chamber of the first cylinder to cause said first piston to move; a second pair of fluid control slots formed on said first piston, one being adapted to interconnect, in accordance with the position of the first piston, said inlet with the third of said inlet conduits and the other to interconnect said outlet with the third of said outlet conduits whereby fluid is transferred respectively to and from the measuring chamber of the first cylinder to cause said first piston to move in a direction opposite to that of its first said movement; and a second pair of fluid control slots formed on said second piston, one being adapted to interconnect, in accordance with the position of the first piston, said inlet with the fourth of said inlet conduits and the other to interconnect said outlet with the fourth of said outlet conduits whereby fluid is transferred respectively to and from the measuring chamber of the second cylinder to cause said second piston to move in a direction opposite that of its first said movement.

References Cited in the file of this patent

UNITED STATES PATENTS

| | | |
|---|---|---|
| 47,893 | Blake | May 23, 1865 |
| 88,475 | Harris | Mar. 30, 1869 |
| 98,353 | Creuzbaur | Dec. 28, 1869 |